Aug. 11, 1931. G. F. DE TOVAROS 1,818,842
PANTOGRAPH CURRENT COLLECTOR FOR ELECTRIC VEHICLES
Filed Sept. 26, 1929
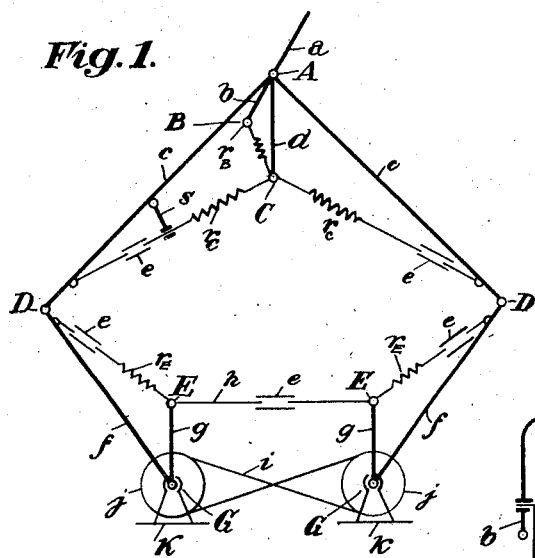
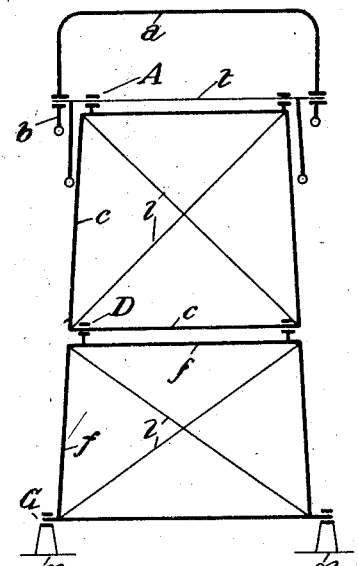
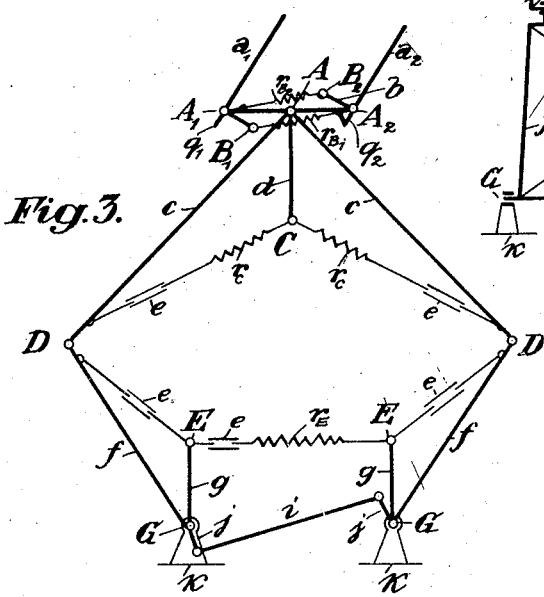
INVENTOR
G. F. DE TOVAROS Patented Aug. 11, 1931

1,818,842

UNITED STATES PATENT OFFICE

GYULA FISCHER DE TOVAROS, OF BUDAPEST, HUNGARY

PANTOGRAPH CURRENT COLLECTOR FOR ELECTRIC VEHICLE

Application filed September 26, 1929, Serial No. 395,328, and in Hungary May 3, 1929.

The supports for current collectors for electric vehicles have to be of such a construction that they press the current collector against the overhead wire with the desired uniform force even at the highest running speed. The main defect of the known pantograph supports consists in that they can only be made of heavy weight and that the joints of the frames are subjected to great stress. Even when expansive ball bearings are inserted in the joints in order to reduce the friction, the frames are, owing to their heavy weight, incapable of holding the current collector against the overhead wire with uniform pressure when sudden variations occur in the distance between the vehicle and the overhead wire by the action of the vehicle springs or by unevenness of the track.

According to the present invention the load of the pantograph frames is reduced by a suitable arrangement of the springs which control the pantograph, and the stress in the pivots is reduced to a minimum, so as to render ball bearings superfluous. The weight of the pantograph can moreover be diminished by employing tubes of a light material in the construction of the frames.

Two embodiments of the invention are illustrated in the accompanying drawings. Figs. 1 and 3 are being side elevations and Fig. 2 a common front elevation.

According to Fig. 1 the inclinable frame $a$ is pivoted on a shaft $t$ arranged in bearings A on the upper frame member $c$ of the pantograph support. Arms $b$ on the frame $a$ are connected with arms $d$ on the shaft $t$ by means of a spring $r^B$. The current collector may be arranged on the upper horizontal member of the frame $a$. Small oscillations of the overhead wire cause a deflection of the frame $a$ about the shaft $t$ while greater oscillations depress the pantograph support which consists of two sets of frames $c$ and $f$ and supporting springs $r_c$ and $r_E$ arranged as illustrated. As the spring $r_c$ the frame $c$ and the arm $d$ form a triangle and in like manner also the frame $f$, the arm $g$ and the spring $r_E$ form a triangle, the frames $c$ and $f$ will only be subjected to compression and no bending moment will occur as in known pantograph devices. By means of the screw shackles $e$ and the springs $r_E$ and $r_c$ may be adjusted so that only a vertical load i. e. the weight of the parts arranged above the joints D and the pressure of the overhead wire are transmitted to the frames $f$ by means of the joints D, and not the whole rod-force that appears in the parts $c$, as in ordinary pantograph devices.

The springs $r$ may be chosen so that the stress of the joints remains constant in all positions of the pantograph. This applies also to the springs $r_E$ the end of which, attached to the joints E, are inter-connected by means of an adjustable system of rods $h$ or a rope. A strut S may be arranged as shown in Fig. 1 for hindering oscillations of the springs $r_c$ and $r_E$. The arm $g$ does not participate in the movement of the pantograph. The frames $f$ of the pantograph are positively moved by the discs $j$ and flexible connections $i$.

In the construction shown in Fig. 3, two inclinable frames $a_1$ and $a_2$ are arranged on the pantograph support. Moreover, the lower parts of the pantograph support differs from that shown in Fig. 1 in that there is arranged a spring $r_E$ common for both sides, acting near the joint D by means of an adjustable system of rods or a rope $g$ which therefore participates in the motion of the pantograph.

The positive connection between the frames $f$ is effected by arms $j$ and the rod $i$. In each constructional form, the bearings $k$ are secured to the roof of the vehicle or to a separate supporting device. The inclinable frames $a_1$, $a_2$ have extensions $q_1$, $q_2$, the ends of which are adapted to engage the frames $c$ of the pantograph, so as to cause the frames $a_1$, $a_2$ to fold against the frames $c$ when the latter are brought into a horizontal position. The frames $c$, $f$ of the pantograph may be stiffened by means of diagonal braces 1 (Fig. 2).

Since the frame members are only subjected to compressive forces, they can be made very light, particularly if they are composed of tubes of light metal.

What I claim is:

1. A pantograph current collector for electric vehicles comprising springs, acting near the common joint of the upper and lower pantograph frames means being provided for causing the inclinable frame member which carries the collector to fold against the adjacent pantograph frame when the latter is brought to a horizontal position.

2. A pantograph current collector for electric vehicles comprising lower frames pivoted on the top of the vehicle, means tending to move these frames one toward the other, upper frames pivoted at the upper ends of the lower frames, springs tending to move the upper frames one toward the other, one end of the latter springs acting near the common joints of the upper and the lower frames, the other end of these springs acting at a member being rotatable around the axis of the upper joint of the upper frames and held in a symmetrical position by the action of said springs.

3. A pantograph current collector for electric vehicles comprising lower frames pivoted on the top of the vehicle, spring means to move these frames one toward the other, upper frames pivoted at the upper ends of the lower frames, springs to move the upper frames one toward the other, one end of the latter springs acting near the common joints of the upper and the lower frames, the other end of these springs acting at a member being rotatable around the axis of the upper joint of the upper frames and held in a symmetrical position by the action of said springs, these springs being of such dimensions that the common joints of the upper and the lower frames transmit to the lower frames vertical stresses only.

4. A pantograph current collector for electric vehicles comprising lower frames pivoted on the top of the vehicle, spring means tending to move these frames one toward the other, upper frames pivoted at the upper ends of the lower frames, springs to move the upper frames one toward the other, the one end of the latter springs acting near the common joints of the upper and the lower frames, the other end of these springs acting at a member being rotatable around the axis of the upper joint of the upper frames and held in a symmetrical position by the action of said springs, these springs being of such dimension that the common joints of the upper and the lower frames transmit to the lower frames vertical stresses only, an inclinable frame carrying the collector pivoted on the top of the pantograph frame, and a spring connecting the lower end of said inclinable frame with the said member.

5. A pantograph current collector for electric vehicles comprising lower frames pivoted on the top of the vehicles, rods rotatable around the pivots of said frames, ropes connecting the upper ends of said rods springs having one end acting at the upper end of said ropes, the other end acting near the upper ends of said lower frames, upper frames pivoted at the upper ends of the lower frames, springs tending to move the upper frames one toward the other, the one ends of the latter springs acting near the common joints of the upper and the lower frames, the other ends of these springs acting at a member being rotatable around this axis of the upper joint of the upper frames and held in a symmetrical position by the action of said springs, these springs being of such dimension that the common joints of the upper and the lower frames transmit to the lower frames vertical stresses only, an inclinable frame carrying the collector pivoted on the top of the pantograph frame, and a spring connecting the lower end of said inclinable frame with the said member.

6. A pantograph current collector for electric vehicles comprising lower frames pivoted on the top of the vehicle, rods rotatable around the pivots of said frames, ropes connecting the upper ends of said rods, springs having one end acting at the upper end of said ropes, the other end acting near the upper ends of said lower frames, upper frames pivoted at the upper ends of the lower frames springs tending to move the upper frames one toward the other, the one ends of the latter springs acting near the common joints of the upper and the lower frames, the other ends of these springs acting at a member being rotatable around the axis of the upper joint of the upper frames and held in a symmetrical position by the action of said springs, these springs being of such dimension that the common joints of the upper and the lower frames transmit to the lower frames vertical stresses only, an inclinable frame carrying the collector pivoted on the top of the pantograph frame, a spring connecting the lower end of said inclinable frame with the said member, and means being provided for causing the inclinable frame to fold against the adjacent pantograph frame when the latter is brought in a horizontal position.

In testimony whereof I affix my signature.

GYULA FISCHER DE TOVAROS.